United States Patent [19]

Jacino et al.

[11] Patent Number: 5,209,935
[45] Date of Patent: May 11, 1993

[54] PLATE GLASS REPAIR APPARATUS PLATE GLASS STRUCTURE AND METHOD

[76] Inventors: Gerald Jacino, 85-19 118 St., Kew Gardens, N.Y. 11415; Anthony Jacino, 17 Normandie La., East Moriches, N.Y. 11940

[21] Appl. No.: 899,011

[22] Filed: Jun. 15, 1992

Related U.S. Application Data

[63] Continuation of Ser. No. 505,053, Apr. 5, 1990, abandoned.

[51] Int. Cl.⁵ .............................................. B32B 35/00
[52] U.S. Cl. ........................................ 425/12; 425/13; 156/94; 264/36; 427/140
[58] Field of Search .................. 156/94; 427/140; 264/36, 22, 25; 425/12, 13, 117, 546, 74.4; 249/141, 95; 118/641, 31.5

[56] References Cited

U.S. PATENT DOCUMENTS

| | | | |
|---|---|---|---|
| 3,839,960 | 10/1974 | Bissonet | 118/31.5 |
| 3,914,145 | 10/1975 | Forler et al. | 156/98 |
| 3,971,316 | 7/1976 | Schank et al. | 264/36 |
| 3,988,400 | 10/1976 | Luhman, III | 425/12 |
| 3,989,778 | 11/1976 | Osborne | 425/174.4 |
| 4,073,094 | 2/1978 | Walz | 51/111 R |
| 4,132,516 | 1/1979 | Story | 425/13 |
| 4,200,478 | 4/1980 | Jacino et al. | 156/94 |
| 4,208,229 | 6/1980 | Giardini | 156/94 |
| 4,249,869 | 2/1981 | Petersen | 425/13 |
| 4,385,879 | 5/1983 | Wilkinson | 425/12 |
| 4,799,753 | 1/1989 | Breitbarth et al. | 433/229 |
| 4,919,603 | 4/1990 | Herold et al. | 425/13 |
| 4,961,883 | 10/1990 | Jacino et al. | 425/12 |

Primary Examiner—Jay H. Woo
Assistant Examiner—Khanh P. Nguyen
Attorney, Agent, or Firm—Auslander & Thomas

[57] ABSTRACT

A mold or molds are provided to repair a substantially conical break in plate glass. The mold enables a repair to include a bead overriding the surface of the glass, particularly on the wider side of the break, providing an effective repair. The bead extending beyond the periphery of the break obscures the outline of the break.

19 Claims, 6 Drawing Sheets

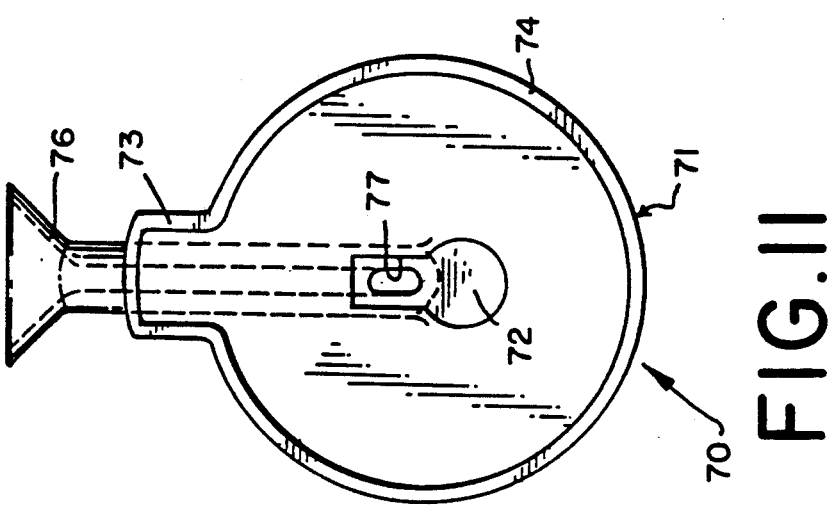
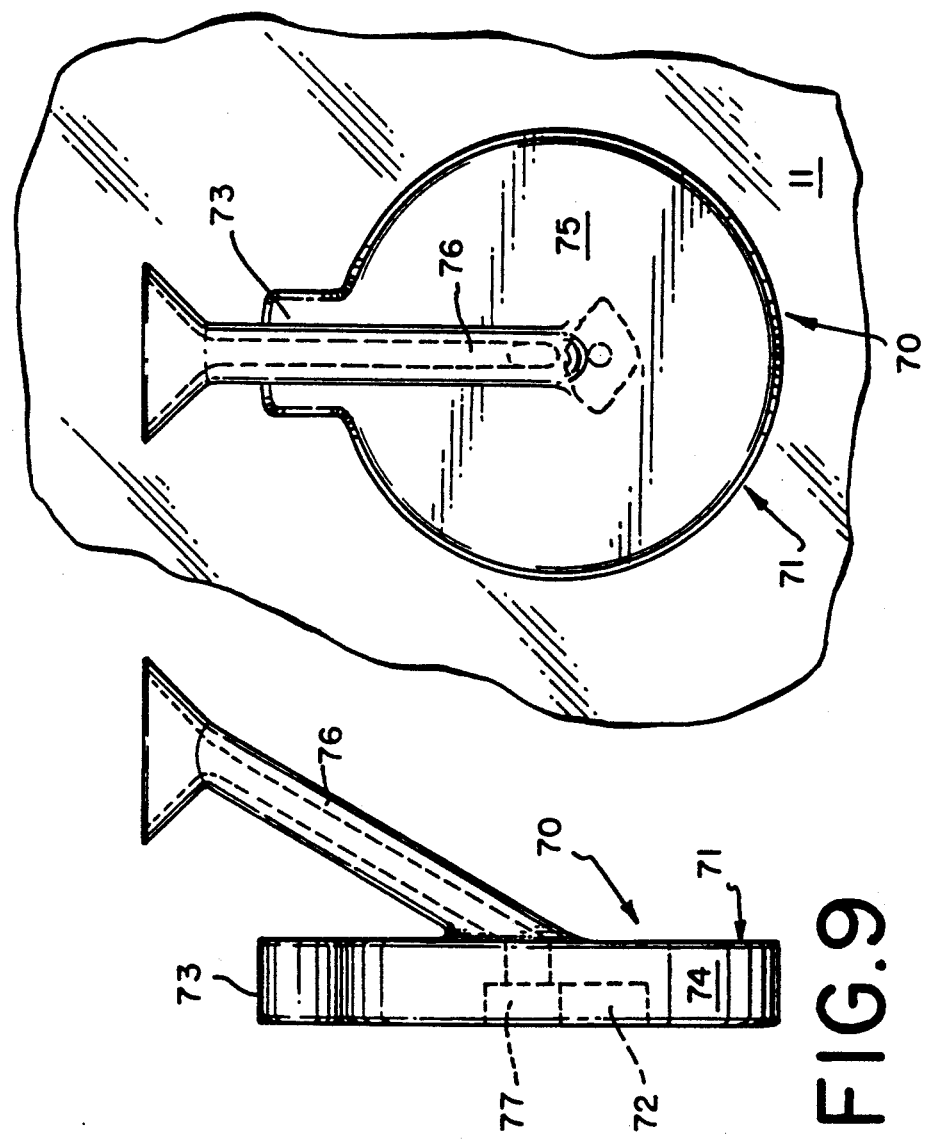

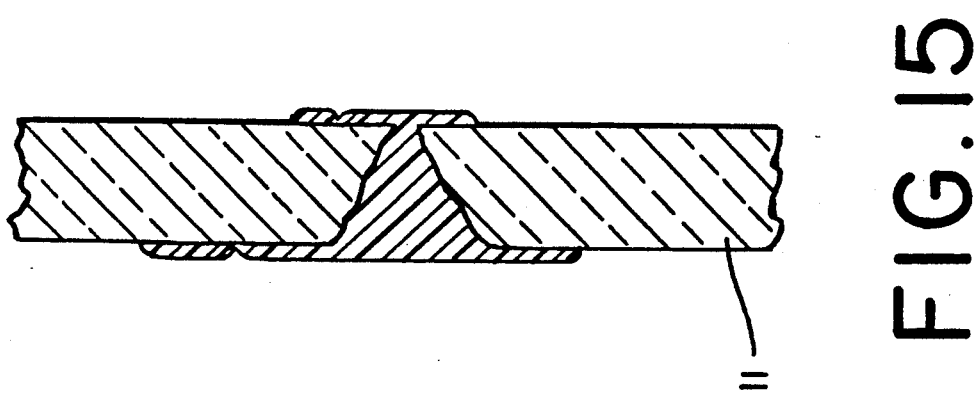
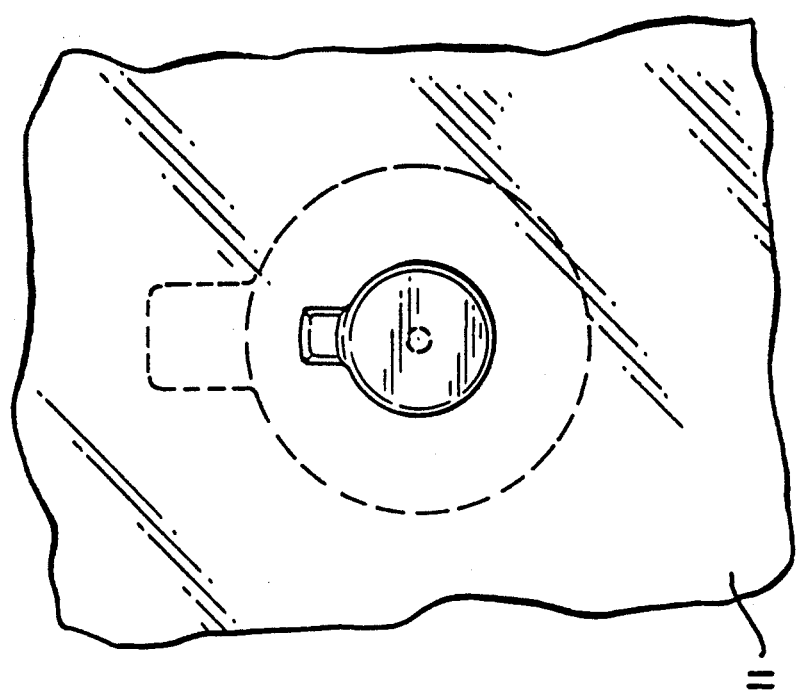
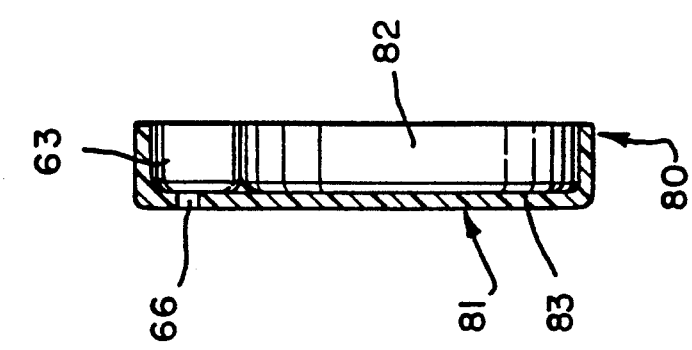

PLATE GLASS REPAIR APPARATUS PLATE GLASS STRUCTURE AND METHOD

This application is a continuation, of application Ser. No. 07/505,053, filed Apr. 5, 1990, now abandoned.

BACKGROUND OF THE INVENTION

The present invention relates to plate glass repair apparatus, a plate glass repair structure.

Glass breaks or cracks, such as in plate glass, mar the visibility through the glass, but oftentimes do not affect the usability of the glass. In many instances, such breaks or cracks themselves can be repaired, substantially restoring the visibility through the glass, obviating very expensive and time-consuming replacement of the entire glass panel which includes the break or crack.

One of the problems in the repair of glass breaks or cracks is that the rough edges of the area and the break and possible striations refract light in patterns different from the normal refraction of the glass, impeding or destroying the normal visibility of the glass. A break in the plate glass usually goes through the entire plate in the form of bullseye or bullseye with variations.

It has been found that glass breaks can be filled with transparent resins which protect the formerly broken areas and which substantially restore the visibility to the repaired area. Such repair in the past has generally required complicated mounting devices and systems. The equipment and techniques were also so complicated that only experienced operators could use such equipment. Such repairs have also not adequately obscured the outlines of the break.

In the past, a simple improvement in the repair of glass adopted the use of a pedestal adhesively mountable over a break. The pedestal was a small plastic device adhesively sealable surrounding a break, sealed against inflow or outflow of air or liquid. The pedestal enabled, simple inexpensive apparatus to effectively substitute for the expensive, complex apparatus of the past. The pedestal of the past was primarily designed for use with safety glass. Safety glass repairs usually required the use of pressure and/or vacuum.

The disclosure of U.S. Pat. No. 4,280,478 discloses a pedestal. The pedestal is also usable for the repair of plate glass. The particular pedestal is different from structures in the prior art as applied to the art of glass repair. The pedestal is distinguished by a flange and seal, adapted to override and surround a break in glass. The pedestal is significant in its mountability, simplicity and economy and is distinguished from other structures disclosed in the prior art with regard to glass repair, with the exception of the pedestal disclosed in U.S. Pat. No. 4,132,516. The pedestal in U.S. Pat. No. 4,132,516 has many similarities to the pedestal of the U.S. Pat. No. 4,280,478 patent and mold of the present invention.

The present invention is a novel mold, system, structure and method for simply and inexpensively using a mold which may be fixed in place like a pedestal for the improved repair of a glass break, particularly in plate glass.

DESCRIPTION OF THE RELATED ART

The present invention provides a mold which may be affixed over a glass break in a manner similar to the pedestal assembly of Jacino U.S. Pat. No. 4,200,478. The mold is employed in a system primarily adapted for the repair of plate glass.

U.S. Pat. No. 3,914,145 is exemplary of a simple device of the prior art for the flush filling of breaks in plate glass, using a repair resin.

U.S. Pat. No. 4,132,516 is exemplary of an early prototype of glass repair apparatus employing an adhesive adhered pedestal.

U.S. Pat. No. 4,208,229, in FIG. 9, discloses an interesting configuration, showing the formation of a flush rivet in plate glass, as part of a complex repair operation. The rivet is formed, using a syringe and disks 250 with openings 254 and radial grooves 252, to allow the escape of air. There is analogy to the present invention. U.S. Pat. No. 4,208,229, is exemplary of the complex expensive prior art using a flush repair.

U.S. Pat. No. 4,249,869 discloses a complex apparatus which includes a barrel 50, somewhat analogous to the spout of the present invention. The present system is infinitely simpler and the hardware less expensive than what is disclosed.

U.S. Pat. No. 4,385,879 is related art showing a similar pour spout used in the repair of plate glass.

U.S. Pat. No. 4,073,094 is exemplary of another complex device used in the repair of plate glass.

SUMMARY OF THE INVENTION

According to the present invention, a mold is provided which may be emplaced over and surrounding a break in plate glass to form a bead on plate glass. The bead may be integral to a molded resin casting, filling the void created by the break.

The mold comprises a hollow body, substantially the shape of the bead to be formed on the glass. The hollow body is adhesively adherable, overriding and surrounding one side of the glass break in liquid tight engagement, so that the repair resin may be cast in the mold. The body, of course, may be otherwise applied and held in place. The use of an adhesive seems to be the most expeditious way of using the mold. A venting system is provided at the top of the mold so that air replaced by resin can be allowed to freely escape to form a bead and to do the repair.

In the repair of plate glass, it is preferable to be able to form a round bead of greater circumference than the glass break, and preferably at the inside portion of a substantially conical bullseye type break, that is, at the wider portion of the break. When a bead is so formed, the visual characteristic, with a proper resin, is such that the outline of the break is substantially invisible. In the prior art, the repairing of a glass break by providing an optical resin flush with the plane of the glass, generally provides a fairly clear visual image of the outline of the break, which is deficit in the repair.

It is preferable to have a tab portion at the top of the bead, extending beyond the circumference of the bead. It is important to have an upper vent means preferably within the tab. Thus, after the resin is set, the tab may be removed with a razor. The resin used is generally a self setting epoxy, or an ultraviolet curable resin.

Where the mold provides a camber on the periphery of the bead, the reflective characteristic of the plastic is to further avoid unwanted reflection and render the periphery of the bead even less observable.

In a preferred embodiment, a second mold may be employed on the opposite side of the plate glass, the second mold providing a smaller bead to cover the normal pinpoint opening of a bullseye break in plate glass. The second mold is normally provided with a tab and spout opening into the upper tab, so that the liquid resin may be poured down the spout and enter above the round bead portion. The mold is engaged, overriding and surrounding the pinpoint opening. The second mold is also preferably adhesively adherable to the plate glass. The tab above the smaller bead is likewise easily removable.

A preferred configuration of the second mold is to have a keyhole shaped mold with the opening of the spout in the tab of the keyhole. In a preferred embodiment, the small bead is also cambered. The small bead is then less obvious and further, obscures the outline of the pinpoint opening.

A repair casting including beads on either side of the plate glass anchors itself in the plate glass and unlikely to be dislodged.

When the small bead is removed, a visible pit may be observed. As a matter of choice, the entire small bead can be removed with a razor and a satisfactory repair obtained.

The mold is preferably of transparent plastic, such as a molded Mylar ®. Transparency enables the operator to see that the repair resin properly enters the mold and is able to pass through both molds, filling both molds and the break. The spout preferably extends to a level above the height of the mold, so that sufficient resin can be supplied to fill the highest portion of the highest mold. In the usual operation, a vent hole in the tab of the mold against the wide portion of the break allows an overflow of resin, indicating the complete filling of both molds in the preparation of the repair. By so doing, all air bubbles are usually discharged from the periphery of the bead. Two identical molds may be used, creating two identical beads.

It is preferable to have a small mold for the pinpoint opening, so that the resin first flows and fills the small opening, then enters the glass break, then fills the glass break and the mold for the second bead. The venting is the simplest in this configuration.

The provision of a spout at the top of the large mold, enables a repair to be initiated from either side of the plate glass and at either the wide side or the pinpoint side of the glass break.

Auxiliary venting may be provided at the top of the mold, particularly if identical sized molds are used in the repair and a spout is employed at the tab.

The resin casting with at least one bead is a new structure in the repair of plate glass.

In another embodiment a repair consists of mounting two seal constructions onto the glass, one on each side of the glass panel, positioned over the break cavity. Each construction forms a chamber above the glass surface. One of the constructions forms a chamber as well as providing a means to affix a spout into which the resin may be poured.

Resin is then poured into the spout, which in turn flows into the chamber, then into the break cavity, and then into the chamber formed on the opposite side of the glass.

A template seal is mounted over the break on the glass side having the smaller opening through the glass, hence, opposite the side where the glass segment is missing.

The template seal is aligned over the small opening positioning the round opening in the construction to the small hole in the break. The tab is positioned on top.

The template seal forms a chamber over the glass to allow for the resin to flow into and then through the small opening of the glass break into the break cavity and chamber formed by the vent gasket construction on the opposite side of the glass.

The template seal provides a mounting construction to support the spout which is then used to hold the liquid resin which in turn feeds the resin to the construction chambers and the break cavity.

The template seal also allows the resin to cure by not having any obstructions blocking the surface area above the break. This feature is required when a ultraviolet lamp is not available and nature sunlight is needed to cure the resin.

A vent gasket construction is placed over the break cavity on the wide side of the break. The breaks are usually somewhat conical in shape, having a pinpoint on one side and a cone base on the other. The vent gasket construction includes an adhesive ring that is mounted onto the glass over the break. The ring forms a chamber above the glass surface. The adhesive is applied around the perimeter of a disc, preferably of clear Mylar ®. A chamber is then formable which is filled with adhesive.

The vent gasket construction has a neck opening tab that allows for the repair resin to overflow, once the construction chamber is filled with adhesive resin.

A Mylar ® disc mounts to the adhesive ring and includes a vent hole which is positioned above the neck opening of the adhesive seal. The vent hole allows for the air to escape from the break cavity and chambers formed by the constructions as the resin flows into the chambers during the repair procedure.

Once the chambers are filled completely, excess resin will enter the tab. Resin may also escape from the vent hole if too much resin is applied. The vent hole prevents air from being trapped in the break and allows for ease of flow of the resin.

The resin, once cured in the chamber, leaves a bead above the glass. The bead formed by the chamber aids in both improved visibility as well as strength to the repair.

The spout extends above both constructions. The spout provides both the opening for which to add the liquid resin into the chambers, as well as providing the means for the liquid to seek the level to completely fill the chamber on the opposite side of the glass.

The spout is positioned on the construction to allow the resin to flow downward into the chamber formed by the template seal. Positioning the spout higher also allows for the chamber to be clear of any obstructions and thereby allows for the resin to be cured using ultraviolet light when a ultraviolet curable resin is used.

The invention includes a simple mold affixable over a plate glass break, wherein the sealing of the opposite side of the break enables a bead to be formed on one side, curing the break. Where the repair is performed with a non-vented mold and the wide part of the break is on the other side of the glass plate, a small vent at the highest point in the break will enable a complete repair. The resin will fill the break and overflow and be easily removable.

The same mold may also be applied to the wide side of the break, in which instance, the mold must be vented.

The mold, of course, must have a hollow in excess of the perimeter of the break so that a bead may be formed. The hollow is preferably round.

The membrane of the back portion may be permeable to a syringe or other means of infusion, wherein resin may be infused, rather than poured through the sprue in order to complete repair and the formation of the bead.

BRIEF DESCRIPTION OF THE DRAWING

Although such novel feature or features believed to be characteristic of the invention are pointed out in the claims, the invention and the manner in which it may be carried out may be further understood by reference to the description following and the accompanying drawings.

FIG. 9 is a side elevation of a sprue mold of the present invention.

FIG. 10 is the sprue mold of FIG. 9 engaged over a break in plate glass.

FIG. 11 is a front elevation of FIG. 9.

FIG. 14 is a front elevation of a repaired break, including a tab and camber on the bead.

FIG. 15 is a section through FIG. 14.

FIG. 16 is a section through another embodiment of the mold of the present invention.

DESCRIPTION OF THE FIGURES

Referring now to the figures in greater detail, where like reference numbers denote like parts in the various figures.

In a preferred embodiment as shown in FIGS. 1 through 5, the glass repair apparatus 10 is shown.

Figure 1:
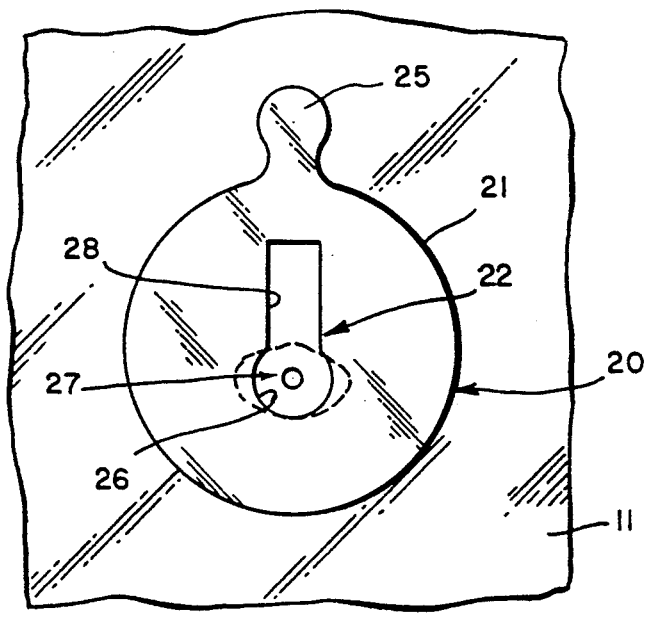
FIG. 1 is an elevation of a template seal of the present invention affixed over a break in plate glass.
Figure 2:
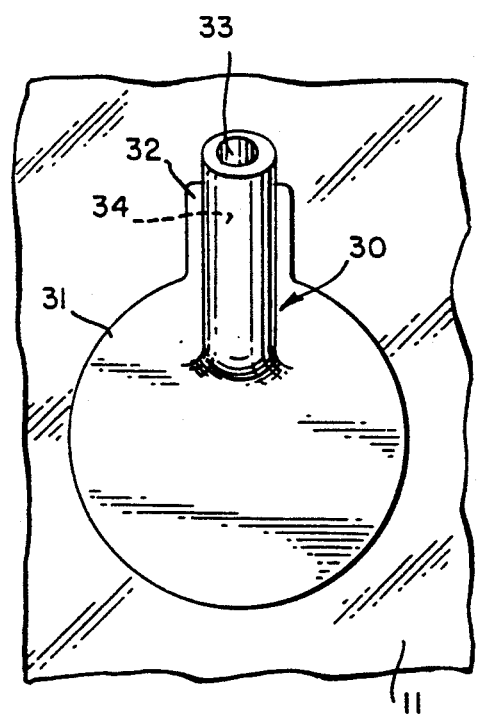
FIG. 2 is a spout affixed to the template seal of FIG. 1.
Figure 3:
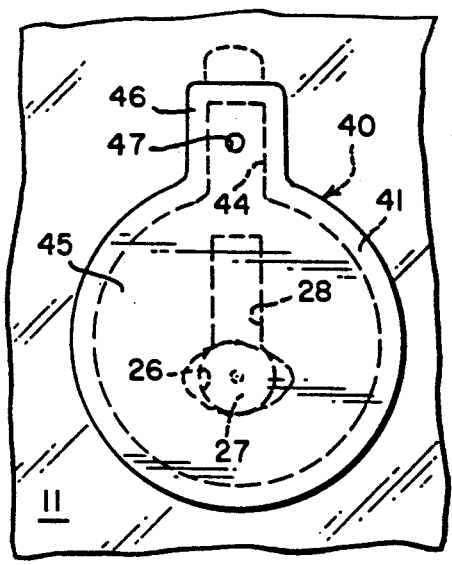
FIG. 3 is a rear elevation showing a vent gasket construction affixed to the opposite side of the break and aligned with the template seal and spout of FIGS. 1 and 2.

The glass repair apparatus 10 comprises a template seal 20, as shown in FIG. 1, a spout 30, as shown in FIG. 2 and a vent gasket construction 40 as shown in FIG. 3.

Figure 4:
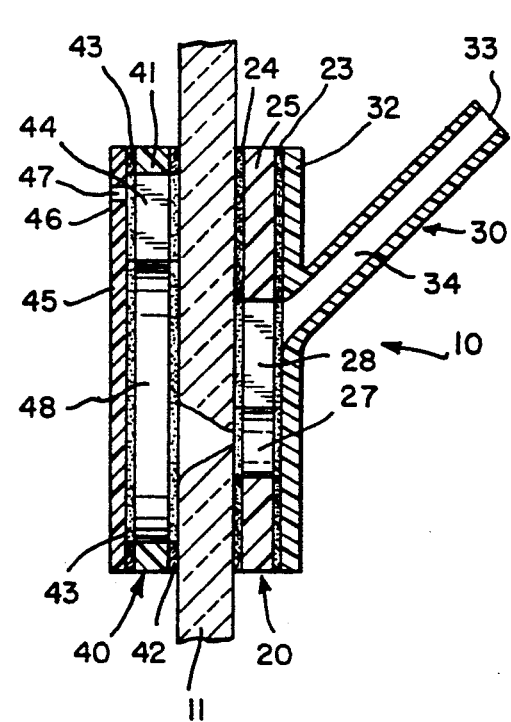
FIG. 4 is a vertical section through plate glass showing the mounted elements of FIGS. 1, 2 and 3.
Figure 5:
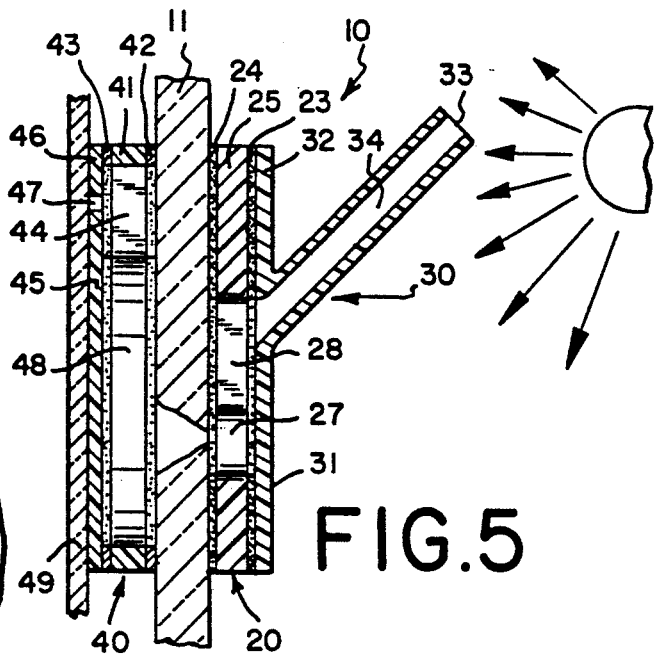
FIG. 5 is a modification of the invention as shown in FIG. 4, including a mirror affixed to the vent gasket construction adapted to reflect sun rays.

The template seal 20, as shown in FIGS. 4 and 5, comprises a flange 21. There is an opening 22 in the flange 21. The opening 22 is substantially in a keyhole shape. As can be seen FIGS. 4 and 5, the template seal 20 is provided with an adhesive layer 23 on one side and another adhesive layer 24 on the other side. There is a tab 25 at the top.

The spout 30 includes an integral flange 31. There is a tab 32 at its top. The spout 30 has an opening 33 to receive repair resin. The chamber portion 34 is a liquid reservoir for the spout 30. The spout 30 extends at an aproximately forty five degree angle from the flange 31 and preferably extends above the plane of the tab 32. The chamber 34 opens into a tab 28 in the opening 22 of the template seal 20.

The vent gasket construction 40 includes a ring 41 having an adhesive layer 42 on one side and an adhesive layer 43 on the other. The ring 41 includes a hollow tab 44. The ring 41 has a cover 45 including a tab portion 46 and a vent hole 47 in the tab 46.

OPERATION

In use in the repair of a break in plate glass 11 it is preferable to clean out the break cavity such as with a pointed probe to insure that a hole through the glass is present. In the event there is no hole through the glass, a hole can be drilled or by continuing to probe until a small hole is broken through. All shards should be removed.

The template seal 20 is mounted over the break, held by adhesive layer 24, centering the round hole 26 of the template seal 20 over the small hole opening of the break cavity. The spout 30 is then mounted to the template seal 20, held by the adhesive layer 23. The spout 30 has a base that is preferably the identical size of the template seal 20, for the purpose of alignment.

The vent gasket construction 40 is mounted on the opposite side of the glass 11, using the tabs 32, 44 of the spout 30 and the vent gasket construction 40 for as alignment guides.

A special resin is slowly poured into the spout 30. The resin flows downward into the chamber 34 formed by the opening 33 in the template seal 20, then into flow into the break cavity. As the resin begins to rise, it first fills the chamber 27 formed by the opening 22 in the template seal 20 being sandwiched between the glass 11 and the spout 30. The resin then flows into the break cavity and then into the chamber 48 formed by the vent gasket construction's 40 ring 41 adhered to the glass 11 and the adhered Mylar ® cover 45 by adhesive layers 42, 43.

As the resin continues to flow into the chambers 27 and 48 and break cavity, the liquid level rises simultaneously in the chambers 27 and 48 and voids until the resin rise in the chambers 27 and 48 and overflows through the vent hole 47 of the cover 45 of the vent gasket construction 40. Once the resin begins to flow out the vent hole 47 it is advisable to pause and allow the resin to settle. The chamber 48 should then be inspected to insure that no air bubbles are trapped. If there are traces of air bubbles, press softly on the Mylar ® cover 45 to force out the air. It is also important to check to see if the liquid level is into the tab 44 in the ring 41 in the vent gasket construction 40. If it is not then additional resin should be added to the chamber 34 of the spout 30 until the resin overflows through the vent hole 47 in the cover 45.

Once the resin completely fills the chambers 27 and 48 the resin must be cured. When an ultraviolet curable resin is used, an ultraviolet light source is applied at the large opening side, at the cover 45. The ultraviolet rays penetrate the clear Mylar ® and cures the resin. It is preferable to cover the vent hole 47 prior to curing to prevent air from entering the seal during the curing so as to prevent air to be drawn through the vent hole 47.

When a special ultraviolet lamp is unavailable, the natural ultraviolet rays from the sun can be used to cure the resin. An ultraviolet reflector such as the mirror 49, as shown in FIG. 5 is adhered to cover 45 with its reflective surface faced inward toward the vent gasket construction 40 cover 45. The sun's rays are allowed to enter through the other side and be reflected back through the resin.

Should a resin such as an epoxy be used, an ultraviolet light source is not required. The epoxy will cure by the interaction of the two part chemical mix.

The template seal 20 is preferably transparent, including transparent through its adhesive layers 23 and 24. Preferably, the template seal 20 is provided with release paper (not shown) over the adhesive layers 23 and 24. By so doing, the template seal 20 may be reserved until its ready to be used, then the release paper can be removed on one side, so that the template seal 20 can be adhered to the glass 11 over a break, preferably on the pinpoint side of the break. Once the template seal 20 is adhered with the tab 25, upward, the release paper may be removed from the other side so that the spout 30 may be adhered to the template seal 20 with the chamber 34 aligned with the opening 22 of the template seal 20. The spout 30 is preferably transparent, so that once emplaced, sunlight, or other ultraviolet light can penetrate for the purpose of curing ultraviolet resin.

The flange 31 includes a tab 32 as an alignment aid, to align the tab 32 of the spout 30 with the tab 25 of the template seal 20. By this careful alignment, there is an assurance that the opening 33 of the spout 30 is at a level above the aligned template seal 20 and vent gasket seal 40, so that there can be a reassurance that the repair resin is able to fully fill the chambers 27 and 48.

The concern about the complete filling of the chambers is to avoid any mar invisibility by having entrapped air bubbles, or incomplete beads in the shape of the chambers 27 and 48. The incomplete beads may also weaken the nature of the repair.

The ring 41 of the vent gasket construction 40 is preferably of Mylar ®, or a urethane type material. The ring is provided with adhesive layers 42 and 43. It does not matter whether the ring itself is clear or opaque. The ring 41 may be separately provided with release paper (not shown) covering the adhesive layers 42 and 43. It is preferable that the clear Mylar ® cover 45, with the vent hole 47 be adhered to the ring 41 with the release paper covering the adhesive layer 42. Thus, the vent gasket construction 40 construction can be conveniently saved until ready for use, at which time the release paper is removed and the vent gasket construction 40 applied to the opposite side of the glass 1, aligning its tab 44 with the tab 25 of the template seal 20.

The opening 22 in the template seal 20 is in a key hole shape, having a round hole 26 with a tab 28 extending vertically upward therefrom. The purpose of the tab 28 is as a reassurance that the resin will fully engage itself within the round hole 26 to form a bead in the glass 11, once the resin has been cured. Once the repair has been completed, the molded portion of tab 28 may be removed with a razor, leaving a round bead. The round bead in the glass 11 may be serve as an anchor for the repair. The bead itself should not particularly affect the visual characteristics of the repaired glass 11. The bead, of course, may be smoothly completely shaved off, flush with the surface of the glass 11.

The bead left after the curing of the resin, encompassed by the vent gasket construction 40 is generally inaccessible after the repair, such as, inside a store window. The fact that bead completely overrides the break, tends to avoid the repair showing the outline of the break. It is believed that the bead also strengthens the repair. Once the repair has been completed, the portion of the bead which has filled into the tab 44 in the ring 41, is generally removed with a razor so that a regular, round bead is retained.

The walls of the ring 41 may be cambered, so that the bead formed within them, is cambered towards the glass 11 without any square edges which might reflect light and make the repair more visible.

With a small bead outside the glass 11 and a large bead inside the glass 11, there is still very little visibility of the repair once completed. The two beads extending over the surface of the glass 11 further anchor the repair against dislodgement. It is believed, nonetheless, that both beads could be shaved flush for an adequate repair.

When ultraviolet curing is employed, the mirror 49 may be attached to the cover 45 by having an adhesive layer intrinsic to the cover 45 with a release paper (both of which are not shown), or a circumferential adhesive layer may be supplied on the mirror 49, with or without release paper, or the mirror 49 may be applied by other means well known in the art, such as covering with a large piece of adhesive to override the mirror 49 and hold it in place against the vent gasket construction 40, or against the glass 11.

The resin employed is generally a nonviscous resin, which pours easily and fully engages all the surfaces. Thus, even irregularities in a break in the glass 11 should be fully covered by the repair and substantially invisible.

During the curing process, the vent hole 47 is preferably unobstructed so that the cover 45 is not drawn in during the curing process, providing a concavity in the bead.

An separate adhesive tab (not shown) may be adhered to the upper portion of the vent gasket construction 40 as a tool to seal the cover 45 in the event that it is necessary to puncture the cover 45 before curing in order to release entrapped air bubbles. The puncture then may be covered with the adhesive to prevent unwanted outflow of resin.

As disclosed in the figures, the flange 31 of the spout 30, the vent gasket construction 40 and the template seal 20 are of identical size. This is a convenience of tooling. The spout 30 and template seal 20 may be of smaller dimension, as long as they adequately cover the pinpoint of the glass break and as long as the spout 30 extends to a level above the vent gasket construction 40 so as to reassure that the resin will fully fill the chamber 48 without gaps or bubbles.

Figure 7:
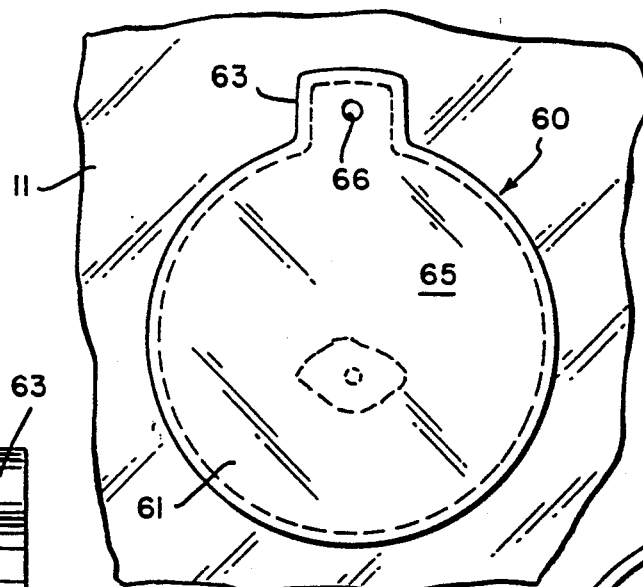
FIG. 7 is the mold of FIG. 6 engaged on a break in plate glass.
Figure 6:
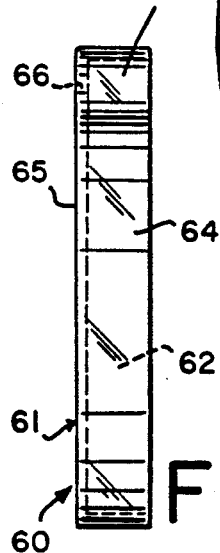
FIG. 6 is a side elevation of a vented mold of another embodiment of the present invention.
Figure 8:
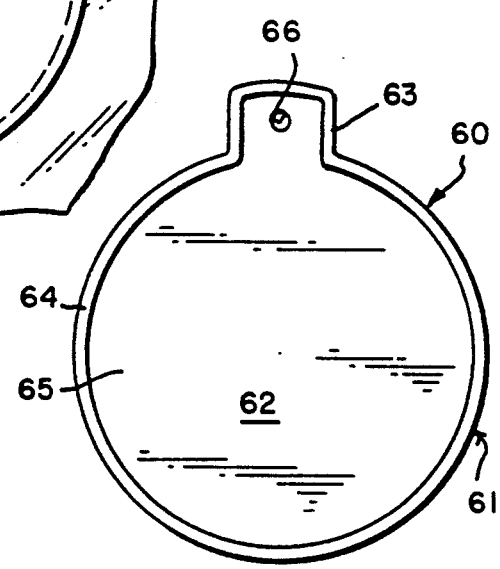
FIG. 8 is a front elevation of FIG. 6.

The vent mold 60, as shown in FIGS. 6, 7 and 8, comprises a unitary body 61 with a hollow 62. The vent mold 60 is provided with a tab 63 and a depending wall 64. The back 65 combined with the depending wall 64 defines the hollow 62. A vent 66 is located in the tab 63.

A sprue mold 70, as shown in FIGS. 9, 10 and 11, is designed to work conjunction with the vent mold 60.

The sprue mold 70 is designed to work in conjunction with the vent mold 60 and is applied to the other side of the glass 11.

The sprue mold 70 comprises a body 71, having a hollow 72 and a tab 73 and a depending wall 74. The wall 74 depends from a back 75 to form the hollow 72. A sprue 76 opens into a tab 77 in the hollow 72. The hollow 72 is substantially in a keyhole shape.

IN OPERATION

In operation, the body 61 of the vent mold 60 is affixed over the surface of the glass 11 over the wide portion of the bullseye conical break.

The body acts as a mold when resin is cured within the outline of the filled glass break.

A bead is affixed over the glass 11, preferably on the wider side of the conical bullseye break in the glass 11. The bead extends beyond the periphery of the break. The body 61 is preferably adhered with adhesive around the periphery of the depending wall 64, although other means may be used to adhere the mold.

At the same time, the body 71 of the sprue mold 70 is affixed to the other side of the glass 11 over the small opening of the bullseye break. The tab 63 and tab 73 are used to help align the vent mold 60 and sprue mold 70.

So that it can be observed that the resin fully fills the hollow 62, providing a bead over the surface of the glass 11, the tab 63, with the vent 66, allows air to be displaced and a bubble free mold made against the face of the glass. The tab 63 being at the top of the hollow 62, receives all of the air from within the hollow 62. The tab 77, in the hollow 72, is meant to be preferably above the entire glass break so that the sprue 76 The vent mold 60 and sprue mold 70 are preferably transparent so that when the clear resin is poured into the sprue 76, the liquid can be seen rising in the cavity formed between the hollows 62 and 72. The sprue 76 extends to a level above the top of the tabs 63 and 73 so that the sprue 76 enters into the tab 77 so that the view of the repair is not obscured. When the resin fills both cavities, any air bubbles from either side of the glass 11 are most likely engaged within the hollow tabs 63 and 77. These tabs 63 and 77 can later be removed without creating visual distortion.

The depth of the hollows 62 are not great and may be about 0.015 thousands of an inch.

After resin has been poured up to the top of the hollow 62 and allowed to overflow just a trifle, the resin may then be cured.

An ultraviolet source, such as an ultraviolet lamp may be supplied, or sunlight may be used as shown in FIG. 5, where a reflective surface is provided, or a minor 49 adhered to the outer surface of the back 65. This is in the case when an ultraviolet curable resin is used.

A clear epoxy may also be used. When a clear epoxy is used, though, it is necessary to make certain that repair is complete before the resin hardens.

The sprue 76, of course, should be transparent, so that it can clearly be seen that the level of the liquid resin reaches into the hollow tab 63.

Figure 13:
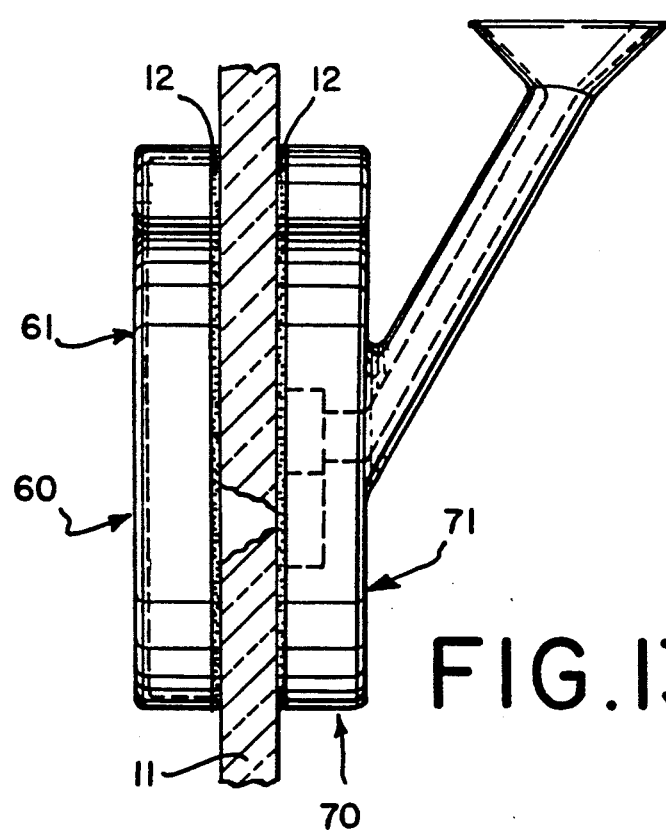

FIG. 13 shows a section of glass with the vent mold 60 and body 61 adhered by an adhesive layer 12.

Figure 12:
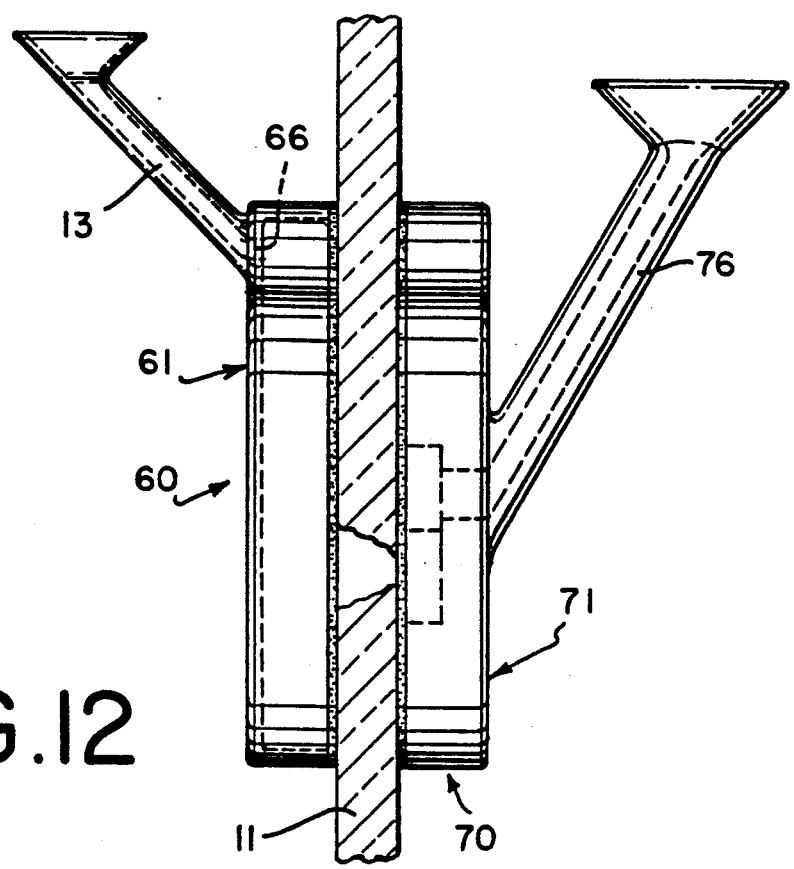
FIGS. 12 and 13 show a partial section of a plate of glass with a break showing different configurations of molds engaged.

FIG. 12 shown an alternate embodiment of the repair where a sprue 13 is engaged in the vent 66. This is not a preferred embodiment, but functions satisfactorily to create a bead overlying the plate glass 11 within the respective hollows 62 and 72 of the vent mold 60 and the sprue mold 70. In this instance, the sprue 76 acts as a vent when the liquid resin is poured through the sprue 13.

As shown in FIG. 14, a casting with cast tabs on either side of the glass 11 remains after the resin is cured. The tabs can easily be removed without marring the visual characteristics of the repair. Further, because the tabs in repair, are at an upper portion, any air bubbles which may be entrained are more likely to be beyond the normal periphery of the bead and beyond the edge of the break and normally removed with the removal of the tab.

As shown in FIG. 16, a mold 80 is provided with a tab 63 and a vent 66. The mold 80, as shown in FIG. 16, also includes a rounded edge 83 within the body 81. Thus, when a bead is molded within the hollow 82 it has a cambered edge, as shown in FIG. 15. The importance of the camber is that it eliminates any surface to reflect light and acts to further obscure the periphery of the bead and the entire repair itself.

It should be noted that the smaller bead, which is usually on the outside of the glass 11 in the repair, may oftentimes be removed.

When both beads are engaged, as shown in FIG. 15, the repair is disengagable as anchored in the glass 11.

Figure 17:
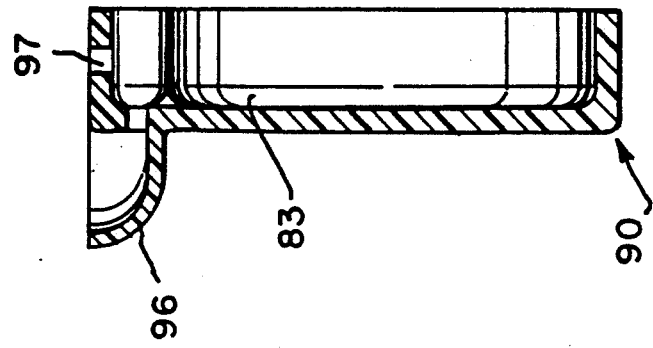

The combined mold 90, as shown in FIG. 17, includes a rounded edge 83 and a cup like sprue 96 with a vent 97. The combined mold 90 can be used, particularly where the opposite side of the glass 11 is covered, flush with the glass 11 and a repair is made only on one side of the glass 11.

Figure 18:
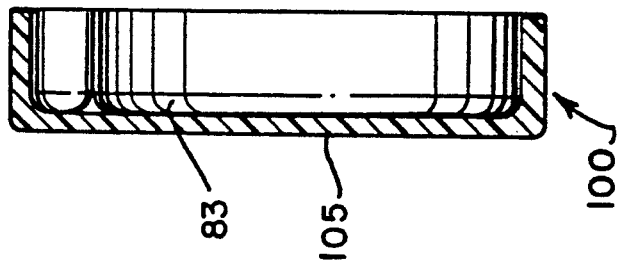

The mold 100, as shown in FIG. 18, is provided with neither vent nor sprue. It is usable where appropriate venting means is provided on the opposite side of the glass 11. The mold 100 is provided with a rounded edge 83. The back 105 is a relatively thin and permeable membrane, through which resin may be introduced without much mar to the surface of the ultimate bead that is created. Resin may be introducable by way of a syringe. It is an effective tool, though not a preferred embodiment.

Figure 19:
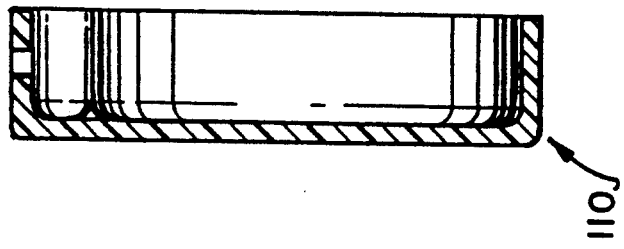
FIGS. 17, 18 and 19 are additional embodiments of the molds.

As shown in FIG. 19, a mold 110 is provided with an opening that may be used either as a sprue or vent, as the case may be.

The visual effect of the bead extending beyond the periphery of the break obscures the outline of the break after the repair in a way not obtainable in the prior art of filling the break flush.

The terms and expressions which are employed are used as terms of description; it is recognized, though that various modifications are possible.

It is also understood the following claims are intended to cover all of the generic and specific features of the invention herein described; and all statements of the scope of the invention which as a matter of language, might fall therebetween.

Having described certain forms of the invention in some detail, what is claimed is:

1. In a system for casting in the repair of a substantially conical break through plate glass and to provide a peripheral rim beyond the perimeter of said break and over the outline of said break, said system usable when said plate glass is in a substantially vertical position and when said conical break is in the form of a void extending through said plate glass, said plate glass having openings from said void on each side, one said opening larger than the other, a mold, said mold comprising a body, said body of a size selected to be in excess of the perimeter of said void opening on a selected side of said plate glass, said body having a back wall and a wall depending therefrom, said depending wall and said back wall connected, a substantially flat hollow defined within said walls, the perimeter of said hollow selected to be greater than the perimeter of said void opening on said selected side of said plate glass and said hollow defining a substantially flat peripheral rim over said plate glass within said perimeter, said rim having an edge, sprue means between said body and said hollow to direct a hardenable liquid resin therethrough, said sprue means opening into said hollow at a point on said edge of the perimeter of said rim and above said opening of said void in said plate glass on said selected side to access said void, said sprue means having an upper end, said upper end extending to a level at least above said edge of said rim above said larger opening of said conical glass break in said vertically positioned plate glass, vent means between said hollow and said body, said vent means opening from said hollow and located at a point selected to be above a level at least above said edge of said rim above said larger opening of said void in said vertically positioned plate glass, said vent means to vent air replaced by said resin when repair resin is introduced, affixing mean, said affixing means to removably affix said body affixed to said selected side of said plate glass, said affixing means further maintaining said liquid resin against leakage from said hollow and free to exit through said vent means, whereby said resin is hardened into a casting in said void including a bead in the form of a peripheral rim conforming to the shape of said hollow and said rim over said plate glass extending beyond the periphery of said glass break on said selected side.

2. The invention of claim 1 wherein said body is an integral molded plastic.

3. The invention of claim 1 wherein said body is transparent.

4. The invention of claim 1 wherein said affixing means is an adhesive.

5. The invention of claim 1 wherein said body includes a tab in said hollow, said tab integral to said hollow defined within said walls and extending substantially vertically from said edge of said rim above said larger opening of said void on said selected side of said plate glass.

6. The invention of claim 5 wherein said sprue means opens into said tab.

7. The invention of claim 1 wherein said back wall is a separate sheet affixable to said depending wall.

8. The invention of claim 7 wherein said back wall is affixed to said depending wall by adhesive means.

9. The invention of claim 7 wherein said depending wall comprises a plastic strip.

10. The invention of claim 9 wherein said plastic strip is affixable to said plate glass by adhesive means.

11. The invention of claim 3 including means to reflect light inward from said back wall.

12. The invention of claim 7 wherein said sprue means is located in said back wall.

13. The invention of claim 7 wherein said depending wall includes a plastic sheet including an opening therethrough.

14. The invention of claim 13 wherein said plastic sheet is affixable to said plate glass by adhesive means.

15. The invention of claim 1 wherein said hollow includes a peripheral rounded portion to impart a camber to the periphery of said peripheral rim.

16. The invention of claim 5 wherein said vent means opens into said tab.

17. The invention of claim 1 wherein said vent means is located in said depending wall.

18. The invention of claim 1 wherein said hollow is round.

19. In a system for casting in the repair of a substantially conical break through plate glass and to provide a peripheral rim beyond the perimeter of said break and over the outline of said break, said system usable when said plate glass is in a substantially vertical position and when said conical break is in the form of a void extending through said plate glass, said plate glass having openings from said void on each side, one said opening larger than the other, a first and second mold, in combination with said plate glass including said void, said first and second molds each respectively emplaced over the respective void openings, said first and second molds each including a body; each said body of a size selected to be in excess of the perimeter of said void opening on said respective emplaced side of said plate glass; each said body having a back wall and a wall depending therefrom; said depending wall and said back wall connected; a substantially flat hollow defined within said walls; the perimeter of said hollow selected to be greater than the perimeter of said void opening on said respective emplaced side of said plate glass and said hollow defining a substantially flat peripheral rim over said plate glass within said perimeter; said rim having an edge, at least one said body having sprue means between said body and said hollow to direct a hardenable liquid resin therethrough, said sprue means opening into said hollow at a point on said edge of the perimeter of said rim and above said opening of said void in said plate glass on said selected side to access said void, said sprue means having an upper end, said upper end extending to a level at least above said edge of said rim above said larger void opening of said conical glass break in said vertically positioned plate glass, at least one said body having vent means between said hollow and said body, said vent means opening from said hollow and located at a point above a level at least above said edge of said rim above said larger opening of said void in said vertically positioned plate glass, said vent means to vent air replaced by said resin when repair resin is introduced, affixing means for each said body; said affixing means adapted to removably affix said body affixed to said emplaced side of said plate glass; said affixing means further maintaining said liquid resin against leakage from said hollow and free to exit through said vent means, whereby said resin is hardened into a casting in said void including a bead in the form of a peripheral rim conforming to the shape of said hollow and said rim over each side of said plate glass extending beyond the periphery of said glass break on each said respective side.

* * * * *